June 10, 1969  H. R. COTHERY  3,448,517

WINDSHIELD-REMOVING TOOL

Filed Aug. 30, 1965

INVENTOR
HARRY R. COTHERY

BY *Hauke & Hauke*

ATTORNEYS

United States Patent Office 3,448,517
Patented June 10, 1969

3,448,517
WINDSHIELD REMOVING TOOL
Harry R. Cothery, 17736 Lennane,
Detroit, Mich. 48240
Filed Aug. 30, 1965, Ser. No. 483,664
Int. Cl. B26b 11/00, 3/00; B25f 1/00
U.S. Cl. 30—140  9 Claims

ABSTRACT OF THE DISCLOSURE

A tool for cutting through the material used to seal around the edge of an automobile windshield so that the windshield can be removed. The tool includes a knife having a handle and a puller arm pivotally connected to the handle to aid in pulling the blade of the knife through the material and means for heating the blade to thereby aid in the cutting.

---

The present invention relates to automotive tools and more particularly to a new tool for cutting the sealant material between a windshield and the body of an automobile.

Automobile manufacturers are presently using butyl tape or polysulphide sealant between the windshield and the portion of the automobile body to which the windshield is attached. Such a sealant material has the advantages that it remains pliable during wide variations in temperature and that it adheres tightly to the surfaces to which it is mounted so that it provides an effective seal. Because the sealant material has superior adhering qualities and because it remains pliable, a problem is presented when it is necessary to remove the windshield for replacement. To remove the windshield it is necessary to cut the sealant and it is desirable to perform an even cut completely around the windshield so that a smooth seat is provided for the new windshield. Tools which have been heretofore provided for this purpose cannot be used when the sealant is butyl tape, polysulphide or similar materials because of the resistance to the cutting action which is produced by the nature of the material.

The present invention provides an improved windshield removing tool which can be used to cut through such materials. As will become more apparent as the description proceeds, the tool of the present invention comprises an arm member having a knife blade on one end and a handle portion on the other. A puller arm is pivotally connected to the arm member and is also provided with a handle portion so that the puller arm can be grasped after the knife blade has been inserted through the sealant adjacent the windshield for pulling the arm member and the knife blade around the periphery of the windshield. To insure that the sealant will be separated as the knife blade is moved through it, means are provided for heating the knife to a temperature high enough to aid in cutting through the sealant.

It is an object then of the present invention to provide an improved tool for removing windshields from automobiles and the like by providing such a tool having a knife blade for insertion into the sealant and means for heating the knife blade to a temperature high enough to facilitate cutting through the sealant.

It is another object of the present invention to improve windshield removing tools by providing such a tool which is economical to manufacture, simple in construction and easy to use.

Figure 1:
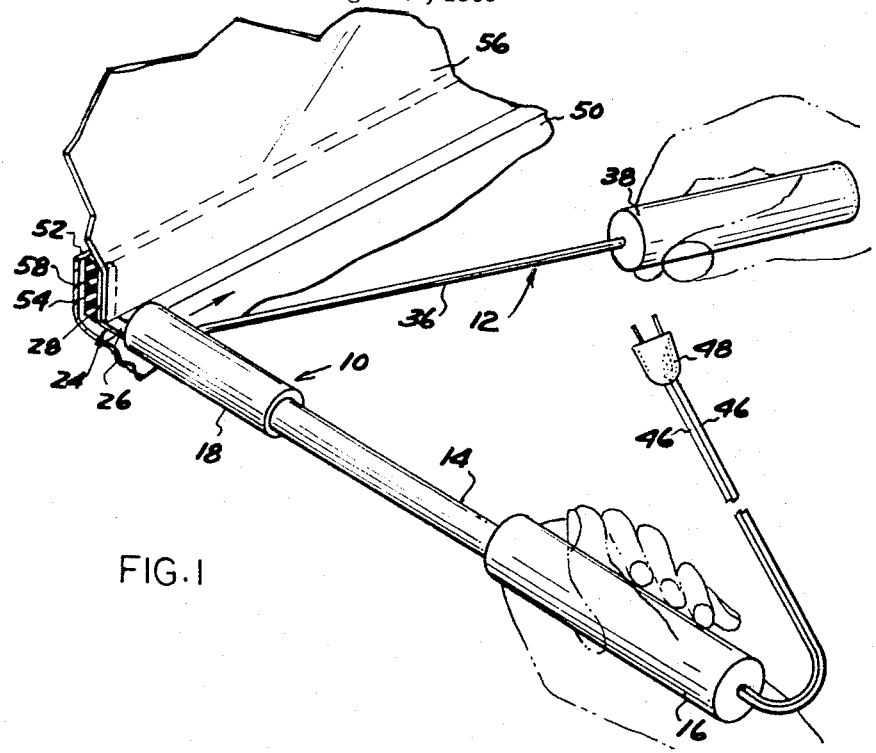
Figure 2:
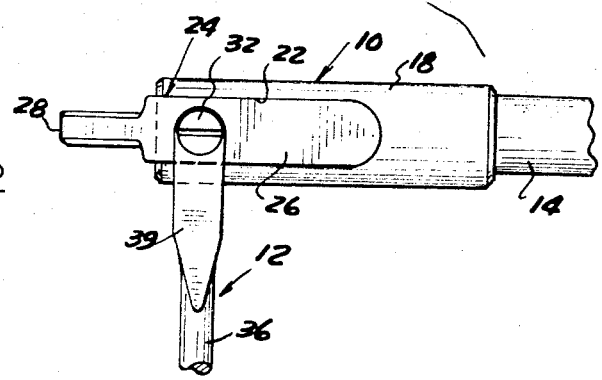
Figure 3:
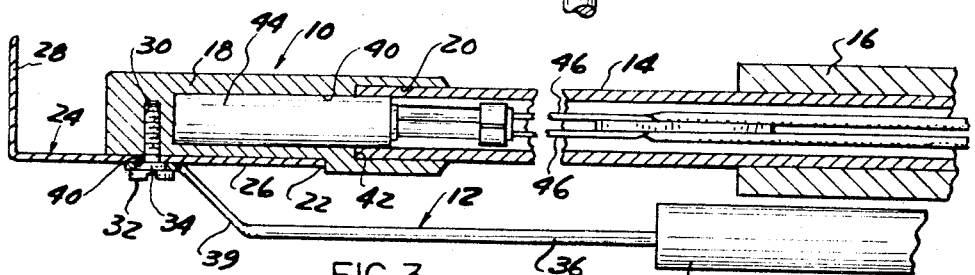

Still further objects and advantages of the present invention will be readily apparent to one skilled in the art to which the invention pertains upon reference to the following drawings in which like reference characters refer to like parts throughout the several views and in which FIG. 1 is a fragmentary perspective view illustrating the tool of the present invention in use, FIG. 2 is a fragmentary elevational view of a portion of the tool of the present invention, and FIG. 3 is a longitudinal cross sectional view of the tool of the present invention.

Now referring to the drawings for a more detailed description of the present invention a preferred tool is therein illustrated as comprising a guide arm assembly generally indicated at 10 and a puller arm generally indicated at 1.

The guide arm assembly 10 preferably comprises a tubular member 14 carrying at one end an elongated handle member 16. A substantially cylindrical end member 18 is provided with an axially extending recess 20 for receiving the opposite end of the tubular member 14. The outer surface of the end member 18 is preferably provided with an axially elongated recess 22 which provides the means for mounting a cutting knife 24 to the end member 18.

The knife 24 preferably comprises a first portion 26 seated in the recess 22 and extending from the end of and in axial alignment with the member 18 and a second portion 28 integral with the portion 26 and extending from the end thereof at a substantially 90 degree angle. The portion 26 and the portion 28 are provided with sharpened blade edges extending along each side from a point adjacent the free end of the member 18. The free end of the portion 28 in addition to the sharpened edge is preferably rounded as can best be seen in FIG. 1.

The end member 18 is provided with a tapped hole 30 for receiveing a screw 32 which mounts the knife 24 in the recess 22 and to the member 18. The screw 32, as can best be seen in FIG. 3, is provided with an enlarged smooth portion 34 adjacent the head thereof which upon tightening of the screw 32, engages the portion 26 of the cutting knife 24 to securely mount the cutting knife 24 in place while at the same time providing a means for pivotally mounting the puller arm 12 to the guide arm assembly 10.

The puller arm 12 preferably comprises a rod 36 carrying an elongated handle member 38 at one end and having the opposite end formed to provide an offset and flattened portion 39. The portion 39 is perforated as at 40 to receive the smooth portion 34 of the screw 32 so that th puller arm 12 is pivotally mounted to the guide arm assembly 10. By offsetting the end portion 39, the puller arm 12 can be pivoted past the surface of the member 18 adjacent the end of the recess 22 and the handle member 38 can be brought to a position beneath the handle member 16 as shown in FIG. 3.

The guide arm assembly 10 further comprises means for heating the cutting knife 24 which will now be described in detail:

The member 18 is provided with an axial recess 40 communicating with and in axial alignment with the recess 20. The recess 40 is smaller in cross sectional area than the recess 20 to form an annular shoulder 42 against which the end of the tubular member 14 abuts. The recess 40 provides the means for positioning a cylindrical electrical heating element 44 of conventional construction within the member 18 and in close proximity with the cutting knife 24. The cross sectional dimensions of the recess 40 and the interior of the tubular member 14 are preferably substantially equal to facilitate insertion of the heating element 44 through the tubular member 14 and into the recess 40. Electrical leads 46 are connected to the heating element 44 and extend through the tubular member 14 and the end of the handle member 16 and are connected at their ends with a conventional electrical plug 48. The end member 18 and the knife 24 are constructed of a suitable heat conducting material with the knife 24 preferably constructed of an alloy of copper and steel or similar materials so that in addition to having high heat conducting characteristics the knife 24 will be strong enough to perform a cutting function.

FIG. 1. illustrates the manner in which the tool of the present invention is intended to be used to remove a windshield from an automobile or the like. The automobile body is indicated generally at 50 and is provided with the usual windshield opening 52 surrounded by a flat windshield seat 54. The windshield is indicated at 56 and is secured in place on the seat 54 by means of the sealant 58 adhering to the windshield 56 and the metal seat 54. The first step in removing a windshield with the tool of the present invention is to remove all the conventional moldings (not shown) which are mounted around the edge of the windshield so as to leave the edge of the windshield exposed as shown in FIG. 1. All soft caulking is removed from the windshield and the surrounding metal of the car body. When the sealant 58 is of a synthetic rubber other than butyl tape, polysulphide or similar materials the knife blade 24 is inserted into the sealant 58 preferably at the bottom of either pillar post (not shown), under the edge of the windshield 56, preferably with the guide arm assembly 10 and the puller arm 12 disposed in alignment as shown in FIG. 3. The tool is then turned to turn the knife blade 24 ninety degrees so as to bring the portion 28 under the edge of the windshield 56 and through the sealant 58 preferably in an area closely adjacent the inner surface of the windshield 56. The puller arm 12 is then pivoted to the position shown in FIG. 1 and the handle member 38 is grasped in one hand while the handle member 16 is grasped in the other hand. With the tool held in this manner, the tool is pulled to move the knife blade 24 through the sealant 58.

All of the edges of the knife blade 24 are sharpened to facilitate insertion of the blade 24 into the sealant 58 and for cutting the sealant 58 away from the windshield 56. The puller arm 10 is adapted to provide the desired needed pressure at exactly the proper cutting point while the guide arm assembly 10 provides a means of insuring that the cutting action will provide a smooth seat upon which the new windshield can be mounted and that the cutting action will be produced closely adjacent the inner surface of the windshield so that a large portion of the sealant 58 will remain adhered to the seat 54 after the windshield 56 has been removed.

When the sealant 58 is of a material such as butyl tape, polysulphide or similar materials which cannot be readily cut by the sharpened edges of the knife blade 24 alone or even with other synthetic rubber materials where it is desired to more easily cut through the sealant 58, the tool is plugged into an electrical outlet. This causes the heating element 44 to heat the member 18 and the knife blade 24. The heating element 44 is preferably designed to heat the knife blade 24 to between 350° and 375° within approximately five minutes. With the knife blade 24 heated, the procedure described above is undertaken with the result that the temperature of the knife blade 24 greatly aids in cutting through the sealant 58. In fact, without heating the knife blade 24, it is almost impossible to cut through sealants such as butyl tape or polysulphide.

It is apparent that a new tool has been described which can be used to remove windshields which are mounted in place with the aid of sealants such as butyl tape and polysulphide and the like. Heretofore no means for readily aiding in easy removal of windshields mounted with such sealants has been known. The tool has the advantage that it can be used to cut through other types of sealants as well so that it is not necessary for the user to own more than one tool.

It is also apparent that although I have described but one embodiment of my invention, many changes and modifications can be made therein without departing from the spirit of the invention as expressed by the appended claims.

I claim:
1. A windshield removing tool comprising
   (a) a guide arm assembly,
   (b) a knife blade carried on one end of said guide arm assembly,
   (c) said knife blade having a first portion extending axially from the end of said guide arm assembly and a second portion extending substantially normal to said first portion, said first and said second portions of said knife blade being provided with sharpened edges,
   (d) a puller arm pivotally carried by said guide arm assembly, and
   (e) means for heating said knife blade.
2. The tool as defined in claim 1 and in which said heating means comprises
   (a) an electrical heating element mounted in said guide arm assembly closely adjacent said knife blade, and
   (b) means carried by said guide arm assembly for electrically connecting said heating element to a source of electrical power.
3. The tool as defined in claim 2 and in which said knife blade is constructed of a copper and steel alloy.
4. A windshield removing tool comprising
   (a) a guide arm assembly,
   (b) said guide arm assembly comprising a tubular member, a handle member carried at one end of said tubular member, a member carried at the opposite end of said tubular member, and a knife blade carried by said last mentioned member,
   (c) said knife blade having a first portion secured to said last mentioned member and extending axially from the end thereof and a second portion extending from and substantially normal with respect to said first portion, said first and said second portions of said knife blade being provided with sharpened edges,
   (d) a puller arm and means pivotally mounting said puller arm to said last mentioned member, and
   (e) means carried by said last mentioned member for heating said knife blade.
5. The tool as defined in claim 4 and in which said last mentioned member is provided with an annular recess, and said heating means comprises
   (a) an electrically energized heating element disposed within said recess, and
   (b) electrical conducting means connected with said heating element and extending through said tubular member and said handle member for connection with a source of electrical power.
6. A windshield removing tool comprising,
   (a) a guide arm assembly,
   (b) a knife blade carried on one end of said guide arm assembly,
   (c) said knife blade having a first portion extending axially from the end of said guide arm assembly and a second portion extending substantially normal to said first portion, said first and said second portions of said knife blade being provided with sharpened edges,
   (d) a puller arm and means mounting said puller arm to said guide arm assembly for pivotal movement about an axis substantially normal to the axis of said guide arm assembly.
7. The tool as defined in claim 6 and in which said puller arm is pivotal in a 360° arc.
8. The tool as defined in claim 6 and including means for heating said knife blade.
9. The tool as defined in claim 6 and in which,
   (a) said puller arm comprises a rod having an elongated handle portion formed at one end and an axially offset and flattened portion at the opposite end, and
   (b) said mounting means comprising a screw extend- ing through said flattened portion into said guide arm assembly and said screw having a smooth portion engaging said flattened portion to permit pivotal movement of said puller arm about said screw.

References Cited

UNITED STATES PATENTS

| | | | |
|---|---|---|---|
| 2,056,951 | 10/1936 | Bohall et al. | 219—227 |
| 2,960,592 | 11/1960 | Pierce | 30—140 |
| 3,331,131 | 7/1967 | Perry, et al. | 30—140 |
| 2,757,454 | 7/1956 | Turcotte | 30—312 X |
| 962,926 | 6/1910 | Stephens | 30—312 X |
| 2,568,012 | 9/1951 | Le Boeuf | 30—312 X |

FOREIGN PATENTS 551,265  2/1943  Great Britain.

ANDREW R. JUHASZ, *Primary Examiner.*

G. WEIDENFELD, *Assistant Examiner.*

U.S. Cl. X.R.

30—317

PO-1050
(5/69)

UNITED STATES PATENT OFFICE
CERTIFICATE OF CORRECTION

Patent No. 3,448,517          Dated June 10, 1969

Inventor(s) Harry R. Cothery

It is certified that error appears in the above-identified patent and that said Letters Patent are hereby corrected as shown below:

IN THE SPECIFICATION

Column 2, line 11 numeral "1." should be

--12.--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents